Patented May 12, 1942

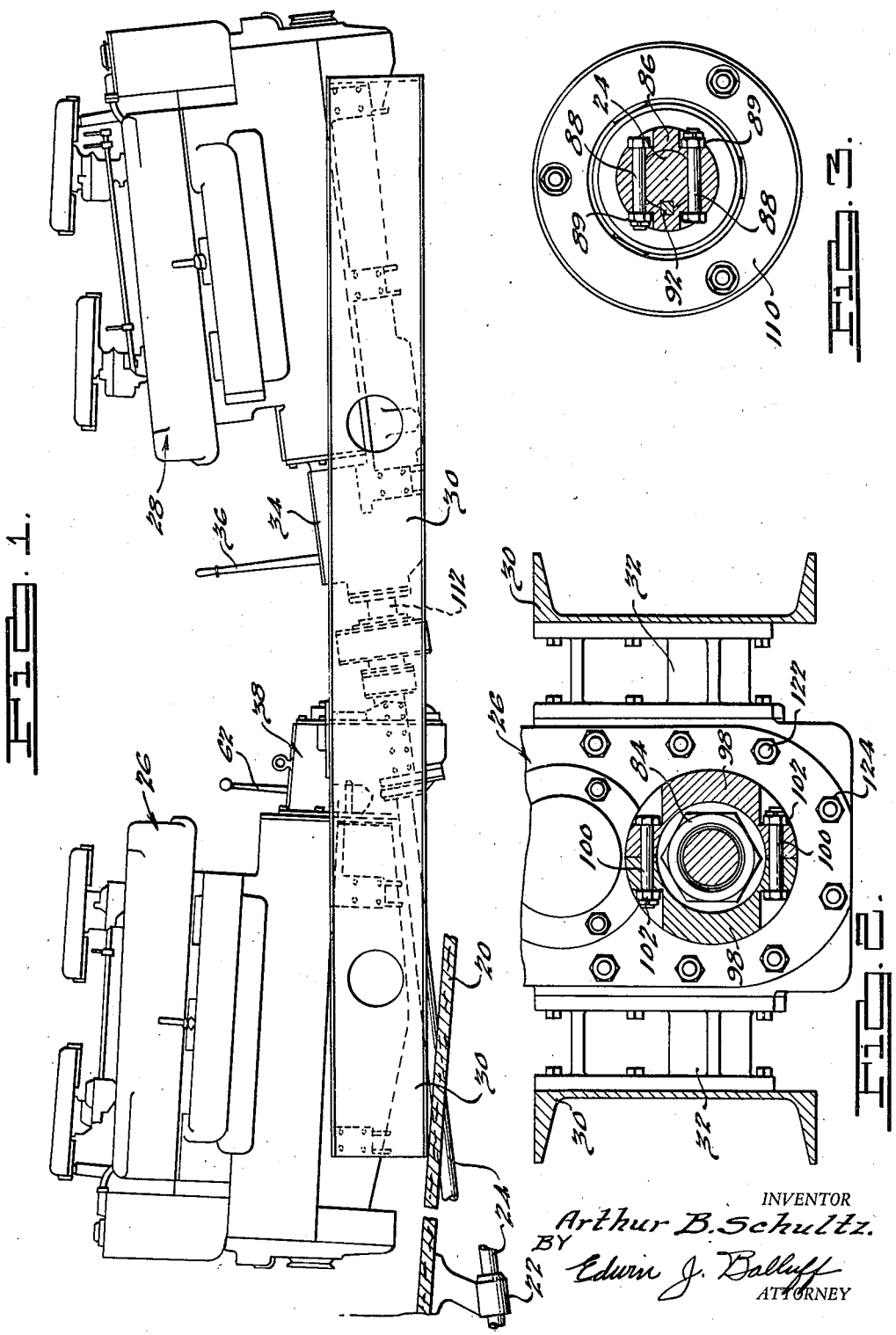

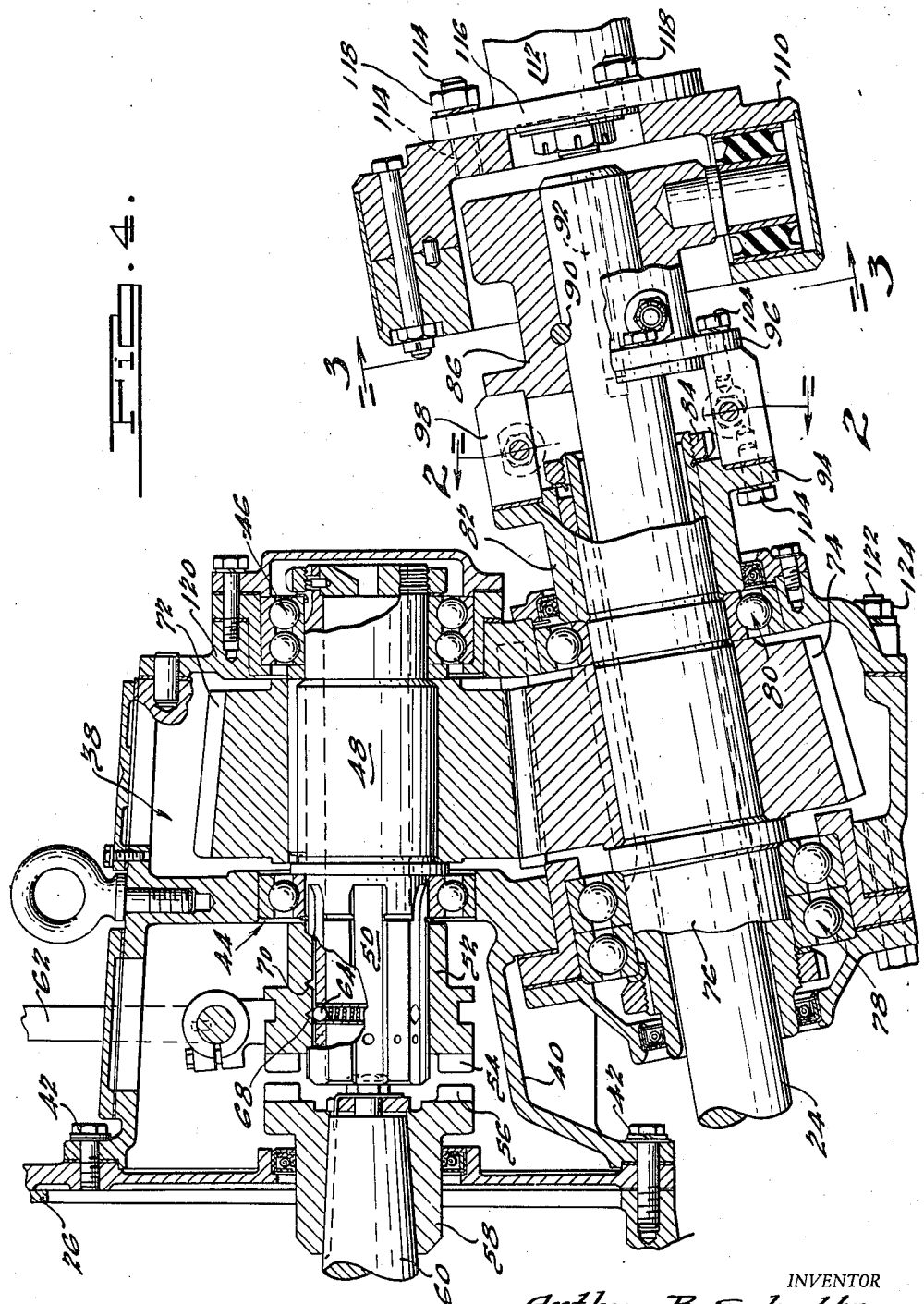

2,282,612

UNITED STATES PATENT OFFICE 2,282,612

MARINE POWER TRANSMISSION SYSTEM

Arthur B. Schultz, Berkley, Mich., assignor to Kermath Manufacturing Company, Detroit, Mich., a corporation of Michigan Application September 25, 1941, Serial No. 412,264

15 Claims. (Cl. 115—0.5)

This invention relates to power transmission systems for marine use and has particular reference to a novel and efficient system for connecting two engines arranged in line to a propeller shaft for driving the same.

A principal object of the invention is to provide a system for connecting two engines in line to a propeller shaft with provisions for removing the propeller shaft and part of the power transmission mechanism without necessitating the shifting or removal of either of the engines.

Another object of the invention is to provide a novel and efficient power transmission system for a pair of engines arranged in line and which system is constructed and arranged so as to expedite the assembly of the entire power system and the servicing of the parts thereof.

Other objects and advantages of the invention will be apparent from a consideration of the following specification taken in conjunction with the accompanying drawings, of which there are two sheets, and wherein:

Fig. 1 is a side elevational view of the power system and illustrating the arrangement thereof with respect to a part of a boat;

Figs. 2 and 3 are sectional views taken along the lines 2—2 and 3—3 respectively of Fig. 4; and Fig. 4 is an enlarged sectional view of part of the power transmission system illustrated in Fig. 1.

Referring now to Fig. 1, there is illustrated a part of a hull 20 of a boat having a bearing 22 at the stern for supporting the propeller end of a propeller shaft 24.

The power system comprises a pair of engines indicated generally at 26 and 28 arranged in line, one in front or behind the other, and mounted on a pair of channel frame members 30 which are suitably secured within the hull. The frame members 30 provide a rigid support for the engines 26 and 28 which are mounted thereon in any suitable fashion, such, for example, as by being bolted directly thereto or by means of several spacer bracket members 32 which are bolted to the sides of the engines and to the insides of the channel members as illustrated in Fig. 2. The engine 28 has assembled therewith, as illustrated in Fig. 1, a two-way drive power transmission or reverse gear 34 which is provided with a manually operated shift lever 36. The transmission 34 has three positions; namely, forward, reverse, and neutral, and which may be selected by manipulation of the shift lever 36, to provide for forward and reverse propulsion of the boat and to permit operation of the engine without movement of the boat.

The driving shaft of the engine 28, and which extends from the left-hand end of the transmission 34 looking at Fig. 1, is arranged in line with the propeller shaft 24 which extends below engine 26 so that the engine 28 actually is tilted upwardly at its front end with respect to the frame members 30.

The engine 26 has its forward end facing the stern of the boat and is arranged above the propeller shaft 24 which extends through the hull 20 of the boat and the bearing 22 and has a propeller (not shown) affixed to the end thereof for propelling the boat. A V-drive transmission indicated generally at 38 is removably secured to the rear end of the engine 26.

Referring now to Figs. 2, 3 and 4, the details of the V-drive 38 and the connections between the two engines and the propeller shaft are more clearly illustrated. The V-drive transmission 38 comprises a case or housing 40 which is removably bolted to the crank case of the engine 26 such as by means of a plurality of bolts 42 which pass through openings in flanges formed on the case 40 and are threadedly secured in threaded openings provided in the rear wall of the crank case of the engine 26.

The housing or casing is formed to provide supports for bearings 44 and 46 in which shaft 48 is journaled. One end 50 of the shaft 48 is splined and has slidably and non-rotatably secured thereon a dog clutch member 52. The dog clutch member 52 is provided with teeth 54 which are adapted to engage with and be released from corresponding teeth 56 provided on a clutch member 58 carried by a rear end of the crank shaft 60 of the engine 26 which extends through the rear wall of the engine 26 and into the V-drive casing 40. The shafts 48 and 60 are aligned and when the shift lever 62 is operated to shift the clutch member 52 to the left to engage the teeth 54 with the teeth 56, the shaft 48 will be coupled directly to the engine crank shaft 60. The clutch member 52 is illustrated in its disengaged position in Fig. 4 and is resiliently held in such position by a spring pressed ball detent 64 which engages a notch 68 internally provided on the clutch member 52. The clutch member 52 is provided with another detent 70 which is adapted to be engaged by the detent 64 when the clutch teeth 54 and 56 are engaged for holding the same against separation.

Between the bearings 44 and 46 the shaft 48 has keyed thereon a bevel or spur gear 72 which is in constant mesh with a bevel or spur gear 74 which is keyed to a sleeve 76 for rotation therewith. The sleeve 76 is journaled in bearings 78 and 80 and projects through an opening in one end of the case of the transmission 38 where it is provided with a coupling member 82 keyed thereto for rotation therewith. A nut 84 threadedly secured on the end of the sleeve 76 holds the coupling member 82 in position on the end of the sleeve 76. It will be observed that the propeller shaft 24 extends through the sleeve 76 and at its forward end has affixed thereto a coupling member 86. As illustrated in Fig. 3, removable bolts 88 carried by the coupling member 86 extend through grooves 90 formed in the shaft 24 for preventing relative axial movement between the coupling member 86 and the shaft 24. A key 92 is operatively arranged between the coupling member 86 and the shaft 24 so as to provide a driving connection therebetween.

The coupling members 82 and 86 are provided with radial flanges 94 and 96 respectively between which a split coupling comprising semicylindrical members 98 is arranged. The flanges 94 and 96 are formed to provide seats which fit the inside diameter of the coupling members 98 which are held in assembled relationship by bolts 100. The bolts 100 extend through suitably formed holes in the coupling members 98 and are threaded at one end for receiving nuts 102. Upon removal of the nuts 102 one of the coupling members 98 may be separated from the other by moving the same radially apart. Each of the coupling members 98 is provided with threaded holes on each radial face thereof for threadedly receiving bolts 104 which pass through suitable openings formed in the flanges 94 and 96. It will thus be seen that each coupling member 98 is bolted to the other coupling member 98 as well as to each of the coupling members 82 and 86, thereby providing a driving connection between the sleeve 76 and the propeller shaft 24.

The coupling member 86 is also formed to provide a part of a flexible coupling 110 which provides a direct driving connection between the propeller shaft 24 and the power or driving shaft 112 which projects from the transmission 34 and is driven by the engine 28. The shaft 24 is in line with the shaft 112 and the coupling 110, of which the coupling member 86 forms a part, is provided with a plurality of screws 114 which extend through suitable openings formed in a flange 116 formed on the shaft 112. Nuts 118 threadedly engaging the screws 114 are provided for holding the coupling member 110 in assembled relationship with the shaft 112. The engine 26 through the clutch 52, 58, the gears 72, 74, the sleeve 76 and the coupling members 82, 98, 86, is arranged to drive the propeller shaft 24 only in one direction, while the engine 28 through the transmission 34 and the coupling 110 is adapted to drive the propeller shaft 24 in both forward and reverse directions. When the transmission 34 is arranged for driving the propeller shaft 24 forwardly, the clutch 52, 58 of the transmission 38 may be engaged so as to couple the engine 26 to the shaft 24 to assist in driving the shaft 24 forwardly, whereas when the transmission 34 is set for reverse, the clutch 52, 56 will have to be disengaged so as to cut the engine 26 out of the driving system in view of the fact that it is not hooked up to drive the shaft 24 reversely.

The V-drive transmission 38 and the coupling members which are connected with the propeller shaft are constructed and arranged so that the same may be removed without disassembling either of the engines 26 or 28 from the frame members 30. Removal of the bolts 104 which connect the flanges 94 and 96 to the coupling members 98 and the bolts 100 which connect the coupling members 98 together will permit the coupling members 98 to be removed in a radial direction, thereby breaking the driving connection between the coupling members 82 and 86. Thereafter, by removing the bolts 88 which are held in position by nuts 89, the propeller shaft 24 can be slid rearwardly and separated from the coupling member 86. Thereafter, by removal of the nuts 118, the coupling 110 may be moved to the left, looking at Fig. 4, and separated from the flange 116 of the shaft 112. Thereafter, the coupling member 110 may be removed from its position. When the coupling member 110 has been removed, the two engines are entirely disconnected except through the frame member 30, and at such time the V-drive transmission may be removed or serviced.

Note that the V-drive transmission unit is removably bolted to the engine 26. When the engines are disconnected, the transmission 34 may be serviced or repaired by removing the cover of transmission 34 which is removably bolted to the crank case of the engine 28. With the coupling member 110 removed, the shaft 112 projecting from the transmission may be removed, as well as other parts of the transmission 34. If it is desired to remove the transmission 38, it only will be necessary to slide the propeller shaft 24 rearwardly so as to move it out from inside the tubular member or sleeve 76. By repetition of the foregoing operations in the reverse order, the entire transmission system may be reassembled.

It is important to note that the engine 26 is arranged above the propeller shaft 24 and hence may be positioned in the stern of the hull 20. The engine 28 is arranged in line with the engine 26 and supported therewith on the frame members 30, thereby forming an integral power transmission system for driving a propeller shaft from two engines in one direction and with one engine in the reverse direction.

In addition to the fact that the V-drive transmission 38 as a whole is removable from the engine 26, it should be noted that the end wall 120 of the transmission 38 is separable from the remainder of the casing 40, the end wall being held in position by means of a plurality of bolts such as 122 and nuts 124. Also the bearings 46 and 78 may be assembled to the housing 40 in such a way as to be removable therefrom.

While the invention has been described with some detail, it is to be understood that the description is for the purpose of illustration only and is not definitive of the limits of the inventive idea. The right is reserved to make such changes in the details of construction and arrangement of parts as will fall within the purview of the attached claims.

I claim:

1. In a marine power transmission system, a frame adapted to be arranged in the hull of a boat, a pair of engines arranged in line and mounted on said frame one in front of the other, a two-way drive power transmission operatively connected to the forward engine, a unidirectional drive power transmission unit operatively connected to the rearward engine and including a hollow driven gear, means for removably securing said unit to the rearward engine, a propeller shaft arranged below the rearward engine and extending through said gear, said two-way drive transmission having a driving shaft arranged in line with said propeller shaft and a coupling assembly arranged between said transmissions and operatively connecting said propeller shaft with said gear and said driving shaft respectively, said coupling assembly being constructed and arranged so that portions thereof may be disconnected and separated to provide clearance space between said transmissions in order to permit removal of said unidirectional transmission unit without moving either of said engines.

2. In a marine power transmission system, a pair of engines arranged in line one in front of the other, each of said engines being provided with a driving shaft, a propeller shaft arranged below the rearward one of said engines and in line with the driving shaft of the forward engine, a power transmission unit providing a driving connection between the driving shaft of said rearward engine and said propeller shaft and comprising a hollow gear through which said propeller shaft extends, and a clutch for controlling said driving connection, a coupling between said gear and said propeller shaft and arranged between said gear and the forward engine, a coupling between said aligned shafts and a transmission operatively arranged between the forward engine and the driving shaft thereof for selectively providing two-way drive of said propeller shaft by said engine.

3. In a marine power transmission system, a frame adapted to be arranged in the hull of a boat, a pair of engines arranged in line and mounted on said frame one in front of the other, a two-way drive power transmission operatively connected to the forward engine, a unidirectional drive power transmission unit operatively connected to the rearward engine and including a hollow driven gear, a propeller shaft arranged below the rearward engine and extending through said gear, said two-way drive transmission having a driving shaft arranged in line with said propeller shaft and coupling means arranged between said transmissions and operatively connecting said propeller shaft with said gear and said driving shaft respectively, said unidirectional transmission including a clutch for breaking the driving connection between said rearward engine and said propeller shaft.

4. In a marine power transmission system, a pair of engines arranged in line one in back of the other, each of said engines being provided with a driving shaft, a propeller shaft arranged below the rearward one of said engines and in line with the driving shaft of the forward one of said engines, a driving connection between the driving shaft of the rearward one of said engines and said propeller shaft and comprising a hollow gear through which said propeller shaft extends, a clutch between said gear and the driving shaft of said forward one of said engines and a coupling between said gear and said propeller shaft, a part of said coupling forming a part of a flexible coupling between said propeller shaft and the driving shaft of said forward one of said engines.

5. In a marine power transmission system, a pair of engines arranged in line and mounted one in back of the other, a two-way drive power transmission operatively connected to the forward engine, a unidirectional drive power transmission unit operatively connected to the rearward engine and including a hollow driven gear, means for removaly securing said unit to the rearward engine, a propeller shaft arranged below the rearward engine and extending through said gear, said two-way drive transmission having a driving shaft arranged in line with said propeller shaft and a coupling assembly arranged between said transmissions and operatively connecting said propeller shaft with said gear and said driving shaft respectively, said coupling assembly being constructed and arranged so that portions thereof may be disconnected and separated to provide clearance space between said transmissions in order to permit removal of said unidirectional transmission without moving either of said engines.

6. In a marine power transmission system adapted to be arranged in the hull of a boat, a pair of engines arranged in line and mounted one in front of the other, a two-way drive power transmission operatively connected to the forward engine and associated therewith in such a manner as to permit removal of at least part of said transmission without moving said engine from its mounting, a unidirectional drive power transmission unit operatively connected to the rearward engine and including a driven member, means for securing said unit to the rearward engine in such a manner as to permit removal of at least part of said unit without moving said engine from its mounting, a propeller shaft arranged below the rearward engine, said two-way drive transmission having a driving shaft arranged in line with said propeller shaft and a coupling assembly arranged between said transmissions and operatively connecting said propeller shaft with said driven member and said driving shaft respectively, said coupling assembly being constructed and arranged so that portions thereof may be disconnected and separated to provide clearance space between said transmissions in order to permit removal of at least part of either of said transmissions without moving either of said engines.

7. In a marine power transmission system, a pair of engines arranged in line, one in front of the other, each of said engines being provided with a driving shaft, a propeller shaft arranged below one of said engines in line with the driving shaft of the other of said engines, a driving connection between the driving shaft of said one of said engines and said propeller shaft and comprising a hollow gear through which said propeller shaft extends, a clutch between said gear and the driving shaft of said one of said engines and a coupling assembly between said gear and said propeller shaft, a part of said coupling assembly forming a part of a flexible coupling between said propeller shaft and the driving shaft of said other of said engines, a part of said coupling assembly comprising members which are removable in a radial direction relative to said shafts so as to provide clearance space between said engines so as to permit removal of parts of said driving connection and said flexible coupling without moving either of said engines.

8. In a marine power transmission system, a frame adapted to be arranged in the hull of a boat, a pair of engines arranged in line and mounted on said frame one in front of the other, a unidirectional drive power transmission unit operatively connected to the rearward engine and including a hollow driven gear, a propeller shaft arranged below the rearward engine and extending through said gear, the forward one of said engines having a driving shaft arranged in line with said propeller shaft and coupling means arranged between said transmission and said forward engine and operatively connecting said propeller shaft with said gear and said driving shaft respectively, said unidirectional transmission comprising a unit including a shaft arranged in line with the crank shaft of said rearward engine and a clutch operatively arranged between said crank shaft and said unidirectional transmission unit shaft for breaking the driving connection between said rearward engine and said unidirectional drive power transmission unit.

9. In a marine power transmission system, a pair of engines arranged in line, each of said engines being provided with a driving shaft, a propeller shaft arranged below one of said engines and in line with the driving shaft of the other of said engines, a driving connection between the driving shaft of said one of said engines and said propeller shaft comprising a hollow gear through which said propeller shaft extends, a clutch for controlling said driving connection, and a coupling between said gear and said propeller shaft and arranged between said gear and the other of said engines, a coupling between said aligned shafts and a transmission operatively arranged between the other of said engines and the driving shaft thereof selectively providing two-way drive of said propeller shaft by said engine.

10. In a marine power transmission system, a pair of engines arranged in line, each of said engines being provided with a driving shaft, a propeller shaft arranged below one of said engines and in line with the driving shaft of the other of said engines, a unidirectional driving connection between the driving shaft of said one of said engines and said propeller shaft comprising a hollow gear through which said propeller shaft extends, a clutch for controlling said driving connection, and a coupling between said gear and said propeller shaft and arranged between said gear and the other of said engines, a coupling between said aligned shafts and a transmission operatively arranged between the other of said engines and the driving shaft thereof selectively providing two-way drive of said propeller shaft by said other of said engines.

11. In a marine power transmission system, a pair of engines arranged in line, each of said engines being provided with a driving shaft, a propeller shaft arranged below one of said engines and in line with the driving shaft of the other of said engines, a unidirectional driving connection between the driving shaft of said one of said engines and said propeller shaft and comprising a hollow gear through which said propeller shaft extends, a clutch between said gear and the driving shaft of said one of said engines and a coupling between said gear and said propeller shaft, a part of said coupling forming a part of a flexible coupling between said propeller shaft and the driving shaft of said other of said engines.

12. In a power transmission system, a transmission unit comprising a shaft, a bevel gear rotatable therewith, a hollow gear meshing with said bevel gear, and a coupling member rotatable with said hollow gear, a shaft extending through said hollow gear and having a coupling member thereon, another shaft aligned with said last-mentioned shaft and coupled thereto through said last-mentioned coupling member, a split coupling comprising a pair of members secured to each other and to said coupling members for connecting said hollow gear to said shaft which extends through said hollow gear, a pair of engines arranged in line, one of said engines being connected to one of said shafts, the other of said engines being connected to another of said shafts, and the other of said shafts extending below one of said engines and constituting a propeller shaft, said split coupling members being separable to provide clearance space between said engines in order to permit removal of at least a part of said transmission unit without necessitating moving either of said engines.

13. In a marine power transmission system a first engine, a transmission operatively connected thereto and including a hollow driven member rotatable about an axis which is angularly disposed relative to the axis of the crank shaft of said engine, a second engine mounted in line with said first engine, a rotary member driven by said second engine and arranged to rotate about an axis in line with the axis of rotation of said hollow driven member, a coupling assembly arranged between said engines and connecting said driven members together and including members which are separable to provide clearance between said engines in order to permit removal of at least a part of said transmission without moving either of said engines, and a propeller shaft extending through said hollow driven member and below one of said engines, said propeller shaft being removably connected to said coupling assembly.

14. In a power transmission system, a transmission unit comprising a shaft, a gear rotatable therewith, a hollow gear meshing with said first-mentioned gear, and a coupling member rotatable with said hollow gear, a shaft angularly disposed relative to said first-mentioned shaft and extending through said hollow gear and having a coupling member thereon, another shaft aligned with said second-mentioned shaft and coupled thereto through said last-mentioned coupling member, a split coupling comprising a pair of members secured to each other and to said coupling members for connecting said hollow gear to said shaft which extends through said hollow gear, a pair of engines mounted in line, one in front of the other, one of said engines being connected to one of said shafts, the other of said engines being connected to another of said shafts, and the other of said shafts extending below one of said engines and constituting a propeller shaft, said split coupling members being separable to provide axial clearance space between said engines in order to permit removal of at least a part of said transmission unit without necessitating moving either of said engines.

15. In a power transmission system, a transmission unit comprising a shaft, a gear rotatable therewith, a hollow gear meshing with said gear, and a coupling member rotatable with said hollow gear, a shaft extending through said hollow gear and having a coupling member readily detachable therefrom, another shaft aligned with said last-mentioned shaft and coupled thereto through said last-mentioned coupling member, a split coupling comprising a pair of members secured to each other and to said coupling members for connecting said hollow gear to said shaft which extends through said hollow gear, a pair of engines arranged in line and mounted one in back of the other, one of said engines being connected to one of said shafts for driving the same, the other of said engines being connected to another of said shafts for driving the same, and the other of said shafts extending below one of said engines and constituting a propeller shaft, said split coupling members being separable to provide clearance space between said engines in order to permit removal of at least a part of said transmission unit without necessitating moving either of said engines.

ARTHUR B. SCHULTZ.